United States Patent [19]

Hess et al.

[11] 4,355,778

[45] Oct. 26, 1982

[54] ADJUSTING DEVICE FOR A SEAT

[75] Inventors: Peter Hess, Coburg; Hans Rampel, Ahorn; Volkmar Schulz, Coburg, all of Fed. Rep. of Germany

[73] Assignee: Metallwerk Max Brose GmbH & Co., Coburg, Fed. Rep. of Germany

[21] Appl. No.: 140,748

[22] Filed: Apr. 16, 1980

[30] Foreign Application Priority Data

May 9, 1979 [DE] Fed. Rep. of Germany ....... 2918761

[51] Int. Cl.³ .............................................. F16M 13/00
[52] U.S. Cl. .................................. 248/429; 74/89.17; 74/422; 248/430
[58] Field of Search .............. 248/430, 429, 393, 420; 5/74 B; 74/89.17, 422

[56] References Cited

U.S. PATENT DOCUMENTS

| | | | |
|---|---|---|---|
| 560,306 | 5/1896 | Traves | 74/422 |
| 1,957,785 | 5/1934 | Knapp | 74/422 |
| 2,381,365 | 8/1945 | Parsons | 74/89.17 |
| 2,392,230 | 1/1946 | Collins | 74/89.17 |
| 2,886,094 | 5/1959 | Pickles | 248/393 |
| 2,930,428 | 3/1960 | DeRose | 248/430 |
| 2,953,190 | 9/1960 | Tanaka | 248/429 |
| 3,022,975 | 2/1962 | Horton et al. | 248/420 |
| 3,430,516 | 3/1969 | Pickles | 248/420 |
| 4,209,159 | 6/1980 | Becker et al. | 248/430 |
| 4,228,981 | 10/1980 | Rampel et al. | 248/430 |

*Primary Examiner*—Francis K. Zugel
*Attorney, Agent, or Firm*—Toren, McGeady & Stanger

[57] ABSTRACT

In an adjusting device for a seat in a motor vehicle, a sliding seat guiding mechanism moves the seat in a generally horizontal direction. The guide mechanism includes an upper part secured to the seat and a support member secured to the floor of the vehicle. A rack is attached to the upper part and is driven by a pinion mounted on the support member for moving the seat in the generally horizontal direction. The rack is adjustably mounted on the upper part to permit limited movement of the rack in the generally vertical direction disposed transversely of the generally horizontal direction of movement of the seat so that proper engagement of the rack and the pinion is assured.

4 Claims, 7 Drawing Figures

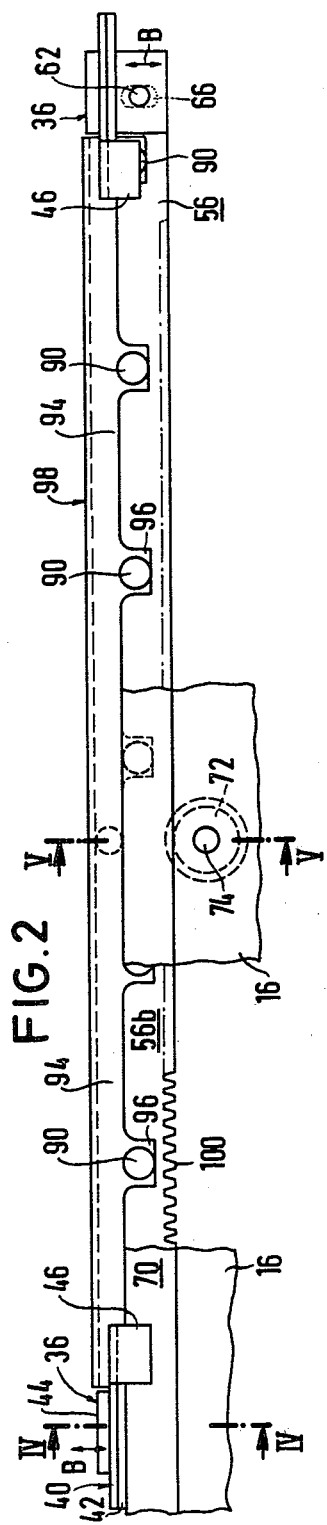
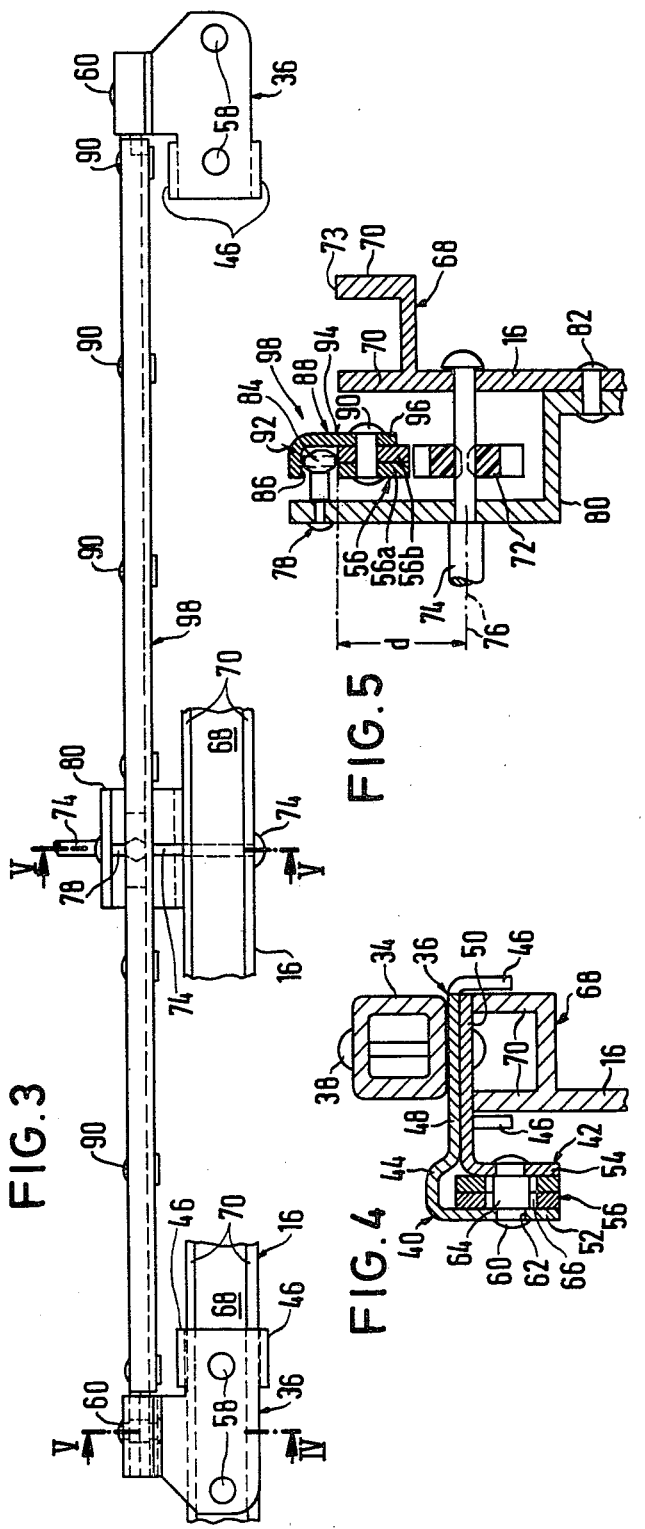

ADJUSTING DEVICE FOR A SEAT

SUMMARY OF THE INVENTION

The present invention is directed to an adjusting device for a seat, such as a motor vehicle seat and, more particularly, it is directed to an adjustment for the means for moving the seat in the generally horizontal direction.

The present invention is an improvement on the sliding seat guide mechanism disclosed in the co-pending application Ser. No. 888,503, filed Mar. 20, 1978. The earlier application is directed, among other things, to an adjusting device for a seat, particularly a motor vehicle, seat in which the seat, with the intermediate arrangement of a sliding seat guide mechanism, rests on support members extending in the direction of movement of the seat. The sliding seat guide mechanism has an upper part which can be moved together with the seat and includes a rack extending in the direction of movement of the seat, which meshes with a pinion mounted on the support member. The arrangement of the rack and pinion is disclosed in German patent application No. P 27 13 793.2.

In this adjusting device, the rack is rigidly attached to the upper part. Any slight inaccuracies in the production of the sliding seat guide mechanism and the rack have the effect that the distance between the rack and the pinion varies along the sliding path of the seat and results in increased wear and a tight operation of the rack and pinion drive.

Therefore, it is the primary object of the present invention to provide an adjusting device which assures reliable operation of the rack and pinion drive with little wear. In accordance with the present invention, the rack is secured to the upper part so that it can be moved for a certain amount. Accordingly, any tolerances which occur in the manufacture of the sliding seat guide mechanism can be compensated.

The distance between the rack and the pinion which is important for effecting the movement of the seat with as little wear as possible of these parts, is variable to adapt to the given conditions when the rack is positioned on the upper part by at least one oblong hole/bolt connection with the length of the oblong hole being arranged transversely of the length direction of the rack.

Preferably, the rack is provided with an oblong hole at each of its ends and a bolt of a fastening part mounted on the upper part extends through each oblong hole. To obtain lateral guidance of the upper part on the support member in a simple arrangement, the fastening part is formed in one piece with downwardly projecting webs which are laterally supported on a guide rail mounted on the support member.

Automatic and accurate adjustment of the distance between the rack and the pinion is gained so that the rack is held in engagement with the pinion by means of a guide member located on the support member in the region of the drive pinion.

The connection between the rack and the guide member is obtained in a simple manner so that the rack forms a longitudinal groove into which the guide member seats.

It is advantageous when the rack includes a toothed portion and a support portion that these two portions are rigidly connected together. The toothed portion can be produced as a body of simple shape formed of a wear-resistant material, such as hardened steel, while the support portion is produced from a material which can be easily formed, such as a stamped sheet metal.

The longitudinal groove in the rack is formed in a simple manner so that the support portion is constructed as a rail with an L-shaped cross section which extends along and for approximately the length of the toothed portion. A wall of the rail is fastened on the toothed portion so that the longitudinal groove is formed between the toothed portion and the rail.

In another advantageous embodiment the pinion is supported on the upper part of the sliding seat guide mechanism rather than on the support member, while the rack is attached to the support member. To adjust the pinion relative to the rack a guide member secured to the upper part extends into a longitudinal groove formed in part by the toothed portion of the rack.

Any lateral tilting of the motor vehicle seat is reliably prevented when the support member is constructed with a guide rail having an essentially U-shaped cross-section with a support rail of the upper part fitted into the guide rail with both rails having interengaging edge portions fitting into one another.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 2 is a detailed side view, partially broken away, of the embodiment shown in FIG. 1;

FIG. 3 is a top view of the device shown in FIG. 2;

FIG. 4 is a sectional view taken along the line IV—IV in FIGS. 2 and 3;

FIG. 5 is a cross-sectional view taken along the line V—V in FIGS. 2 and 3;

DETAIL DESCRIPTION OF THE INVENTION

Figure 1:
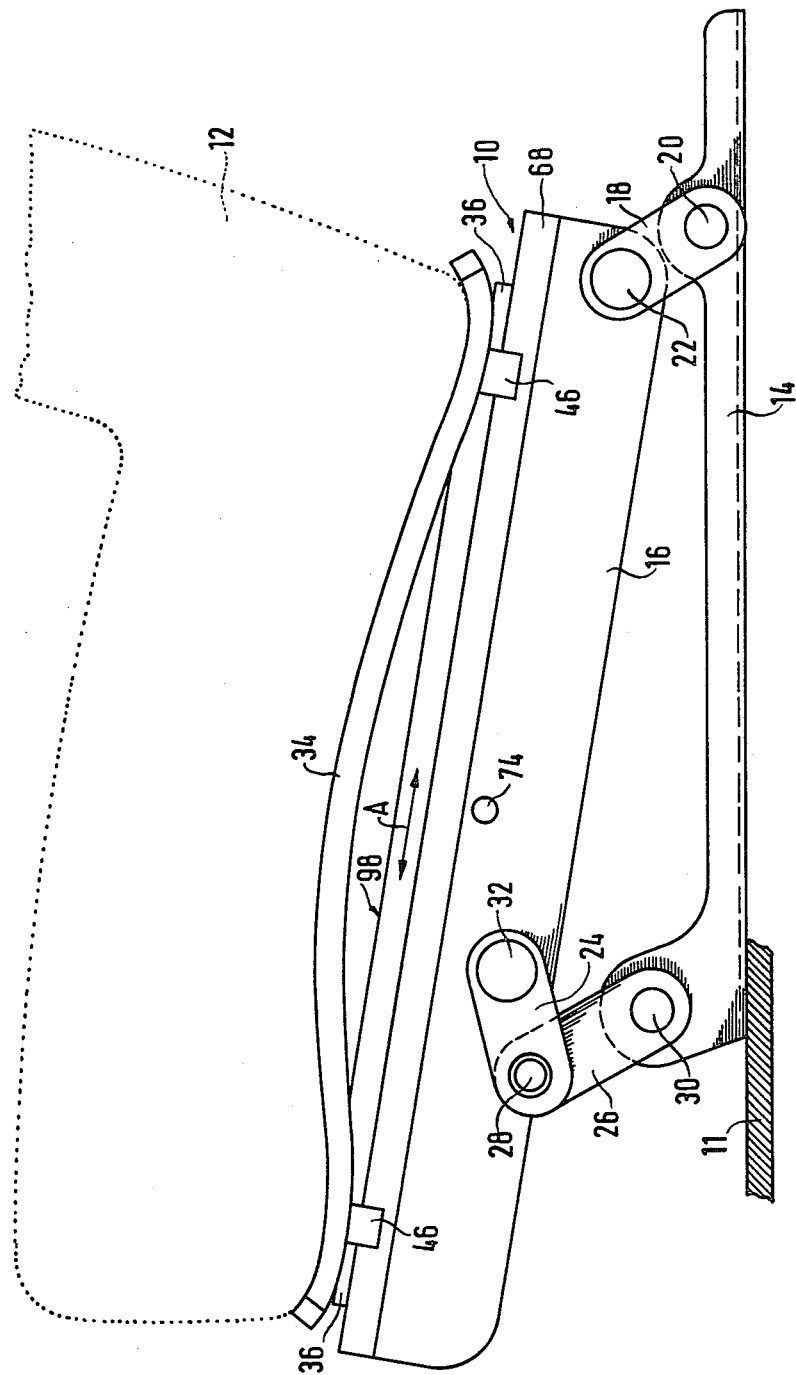
FIG. 1 is a simplified side view of a first embodiment of an adjusting device incorporating the present invention.

In FIG. 1 an adjusting device 10 is fastened to the floor 11 of the motor vehicle and supports a seat 12 as shown in dotted line. A lower part 14 of the adjusting device 10 is rigidly connected to the floor 11 through bolt connections, not shown. A support member 16 is adjustable relative to the lower part 14 with respect to the inclination and vertical position by means of two swivel connections, one located at the rear end of the support member 16 and the other located adjacent its front end. The rear swivel connection located below the back rest of the seat, that is the right-hand end as seen in FIG. 1, is formed of a swivel lever 18 pivotally supported on the lower part 14 and the support member 16 through pins 20, 22. One of these pins 20, 22 is connected to the swivel lever 18 so as to be fixed with respect to relative rotation and can be driven via a drive member, not shown.

The forward swivel connection, that is the one to the left as viewed in FIG. 1, consists of two swivel levers 24, 26 which are connected together in an articulated manner by a double headed rivet 28 and are hinged by the pins 30, 32 to the lower part 14 (swivel lever 26) and the support member 16 (swivel lever 24), respectively. The pin 32 is connected to the swivel lever 24 so it is fixed with respect to relative rotation and can be rotated relative to the support member 16 by a drive, not shown. By actuating the drives of the rearward and forward swivel connections, the vertical position and the inclination of the support member 16 can be adjusted within predetermined ranges.

For length adjustment, the seat 12 can be moved back and forth along the support member 16 in the direction of double arrow A, that is, the sliding direction of the seat. An upper part 34 of the adjusting device or sliding seat guide mechanism is shown in FIG. 1 and is only schematically illustrated as a tubular frame. The upper part 34 is secured to the underside of the seat 12 and rests on the support member through fastening parts 36. In FIG. 4 the tubular upper part 34 is rigidly connected to one of the fastening parts 36 through a double headed rivet 38. In FIGS. 2, 3 and 5, upper part 34 is not illustrated in order to simplify and clarify the showings of the adjusting device. The fastening part 36 is formed of two sheet metal stampings, an upper stamping 40 and a lower stamping 42, note FIGS. 2 and 4. As shown in FIG. 4, the stampings 40, 42 are essentially L-shaped. Spaced laterally from the upper part 34, the upper stamping 40 has an upwardly directed protuberance 44. In addition, the upper stamping has two downwardly bent webs 46, note FIGS. 2, 3 and 4. The webs are spaced apart along the upper stamping 40 and extend downwardly. The two stampings 40, 42 are in contact with one another along their horizontal walls 48, 50, note FIG. 4. Their vertical walls 52, 54 extend downwardly from one edge of each and are in spaced relation so that a rack toothed portion 56 is positioned between them. The two stampings 40, 42 are held together, on one hand, by double headed rivets 38 which extend downwardly through the upper part 34 and through the horizontal walls 48, 50 with the rivets passing through holes 58 extending through the stampings, note FIG. 3. On the other hand, another double headed rivet 60 extends through the vertical walls 52, 54 and secures the rack toothed portion 56 between the two stampings 40, 42. The double headed rivet 60 extends through circular holes 62 in the stampings 40, 42, note FIG. 4, and the rivet has an axially extending middle part 64 of increased diameter which ensures the predetermined distance between the vertical walls 52, 54 of the stampings 40, 42. The length of this middle part 64 is selected slightly larger than the corresponding thickness of the the rack toothed portion 56. Further, it can be seen in FIG. 4 that the double headed rivet 60 extends through an oblong hole 66 in the rack toothed portion 56. The oblong hole 66 is illustrated in FIG. 2 by dotted lines and the length of the oblong hole extends in the direction B perpendicularly of the length of the rack toothed portion 56, that is, transversely of the sliding direction A.

The upper part 34 has four fastening parts 36, two of which are mounted on each of the two support members 16 located along the opposite long sides of the seat 12, note FIG. 1. As displayed in FIG. 4, the upper part or end of the support member 16 is formed by a guide rail 68 with two laterally spaced upwardly extending webs 70. These webs 70 extend along the support member 16, note FIG. 3. The horizontal walls 48, 50 of the fastening parts 36 rest on the upper ends 73 of the webs 70. The upper ends 73 are located at the same level. The downwardly projecting webs 46 of fastening part 36 are located closely outwardly from the webs 70 of the guide rail 68 with little play between them, accordingly, the lateral guidance of the upper part 34 at the support members 16 is ensured. The upper part 34, and with it the seat, can be moved back and forth in the sliding direction A, note FIG. 1, via the four fastening parts 36 moving over the guide rails 68 on the two support members 16.

To move the seat 12 in the sliding direction A by means of an electric motor, a pinion 72 is arranged on each of the support members 16, note FIGS. 2 and 5, so that the pinion can be driven by a drive shaft via a drive, not shown. The pinion 72 engages the rack toothed portion 56 which is connected at each of its ends to a different one of the fastening parts 36. If a rigid connection is provided between the toothed portions 56 and the fastening parts 36 and, thus, to the upper part 34 of the seat 12, any insignificant inaccuracies which occur in manufacture, for example, of the guide rails 68 or of the fastening parts 36 have the result that the distance between the toothed portion 56 and the pinion 72 deviates from a predetermined desired value and, depending on the desired position, may have a different magnitude. For an accurate and reliable operation of the rack and pinion drive, however, it is absolutely necessary that the predetermined distance between them is maintained. To assure that the desired distance between them is maintained, the ends of the rack toothed portions 56 are supported, as mentioned above, on the two fastening parts 36, note FIGS. 2 and 3, in such a way that they can be moved independently of one another in the direction of the double arrows B, note FIG. 2, relative to the fastening parts 36 and, as a result, also relative to the upper part 34. Accordingly, the double arrows B are oriented in the direction of the distance between the pinion 72 and the rack toothed portion 56. The desired dimension of the distance between the rack toothed portion 56 and the pinion 72 is represented, in FIG. 5, by the distance d between the pinion axis 76 and the upper edge of the rack toothed portion 56. To adjust this distance in all of the sliding positions of the seat 12 in an automatic manner and independent of any inaccuracies in the manufacture of the parts involved, a guide member 78 is provided above the pinion 72 and the rack toothed portion 56. The guide member 78 acts directly against the upper end of the rack toothed portion 56. The guide member 78 is riveted to a support stirrup 80 which, in turn, is rigidly connected by a double headed rivet 82 to the support member 16 at a position spaced below the pinion 72.

Guide member 78 includes a guide roller 84 located on its end spaced laterally from the support stirrup 80 and the guide roller fits into a longitudinal groove 86. The bottom portion of the groove 86 is defined by the upper end of the rack toothed portion 56. An L-shaped rail 88 is fastened to the rack toothed portion 56 and includes an essentially horizontal wall 92 spaced upwardly from the upper end face of the rack toothed portions 56. Accordingly, the upper end of the longitudinal groove 86 is formed by the downwardly facing surface of the wall 92 while the lower side of the groove is formed by the upper end face of the rack toothed portion 56. The vertical wall 94 of the rail is provided with a row of fastening lugs 96 through which double headed rivets 90 extend, see FIGS. 2, 3 and 5. The double headed rivets 90 connect the rail 88 to the two-part rack toothed portions consisting of part 56a and part 56b, to provide an inherently stable member identified as rack 98. The parts 56a and 56b of the rack toothed portion 56 are formed of hardened steel and are secured alongside one another so that their rows of teeth 100 are exactly opposite one another, note FIG. 2.

During operation, the guide member 78 ensures that the once adjusted desired dimension d is maintained. The rack 98 is moved toward or away from the upper part 34 and this movement is provided by the support attachments at the ends of their rack 98. With the length of the rack 98 of 250 to 350 mm, the length of the oblong holes 66 which afford the adjustment in the direction of the double arrow B is determined so that each end can be shifted in the direction B by a maximum of 2 to 4 mm. This adjustability makes it possible to compensate for even great inaccuracies occurring in manufacture or in deformation caused during use.

Figure 6:
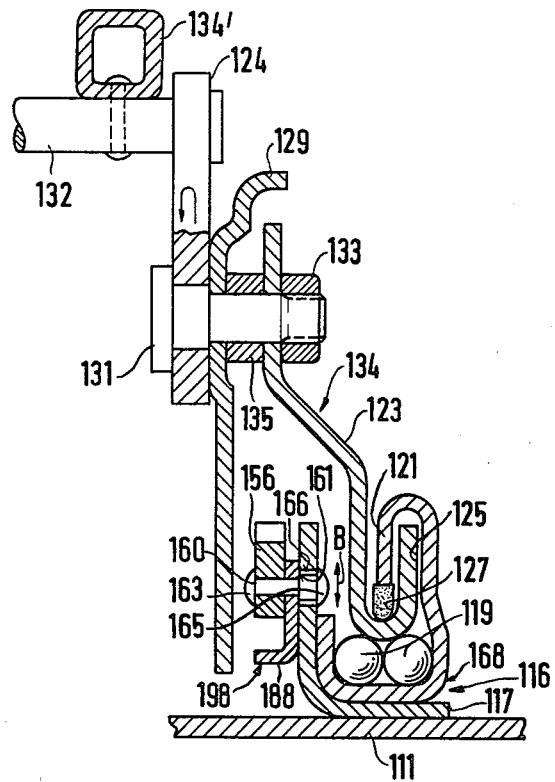
FIG. 6 is a cross-sectional view, similar to that shown in FIG. 4, of a second embodiment of the present invention.
Figure 7:
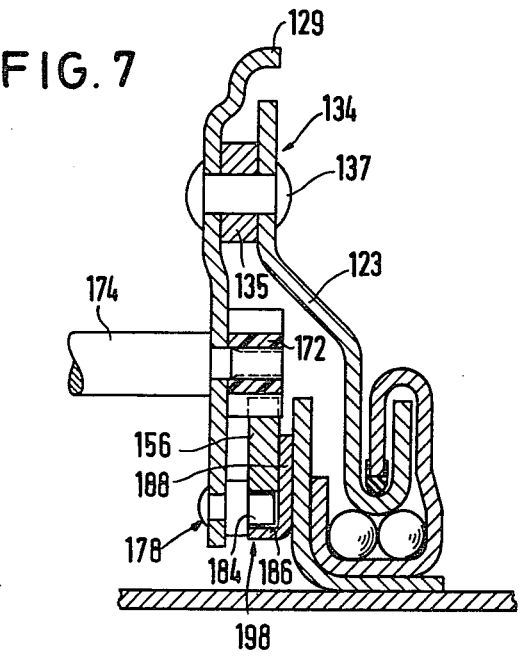
FIG. 7 is a cross-sectional view, similar to that shown in FIG. 5, of the second embodiment.

In FIGS. 6 and 7 another embodiment of the adjusting device is illustrated with the pinion supported on the upper part of the sliding seat guide mechanism rather than on the support member, and with the rack mounted on the support member and not on the upper part. The parts in FIGS. 6 and 7 which correspond to those in FIGS. 1-5 are provided with the same reference numerals, however, 100 has been added to the reference numerals in FIGS. 6 and 7.

The section displayed in FIG. 6 corresponds to that in FIG. 4, that is, the section is taken through an end of the rack 198. Unlike the first embodiment, note particularly FIG. 1, the sliding seat guide mechanism formed of support member 116 and the upper part 134 is fastened directly to the floor 111 of the vehicle by bolt connections, not shown. Similar to the swivel cnnections in FIG. 1, four swivel levers 124 are hinged to the upper part 134 with two of the swivel levers 124 being connected by connecting pins 132 extending transversely of the sliding direction. A schematically illustrated tubular frame 134' of the motor vehicle seat is supported on two shafts 132. By pivoting the motor-driven swivel levers 124, a vertical position and inclination of the motor vehicle seat can be adjusted.

The support member 116 is formed of two shaped sheet metal members 117, 168 which are rigidly connected together by rivets. Sheet metal member 117 is an L-shaped rail and the other sheet metal members 168 is a multi-bend shaped guide rail having one part forming a U-shaped section with the free end of the U-shaped section forming an edge region 121 bent inwardly and downwardly toward the floor 111.

Within the shaped guide rail 168, the upper part 134 is supported by the support rail 123 on bearing balls 119. An upwardly bent edge 125 of the support rail 123 extends into the U-shaped part of the guide rail 168 and is positioned alongside the downwardly bent edge region 121 of the guide rail. A rubber protrusion 127 on the lower edge of the edge region 121 bears against the bight portion of the U-shaped bend in the lower end of the support rail 123. In this manner, the position of the support rail 123 is fixed in the direction transversely of the sliding direction and, in particular, lateral tilting of the motor vehicle seat is avoided.

The support rail 123 is rigidly connected at several places to a base plate 129 of the upper part 134. In FIG. 6, the support rail 123 and the base plate 129 are held together by a threaded bolt 131 and a nut 133. A spacer sleeve 135 encircling the bolt 131 maintains the support rail and base plate in spaced relation. The above-mentioned swivel lever 124 is rotatably supported on the bolt 131. The swivel lever 124 is driven for the adjustment of the vertical position and the inclination of the seat by a motor drive, not shown.

In FIG. 7 another location of the connection between the support rail 123 and the base plate 129 is illustrated in the form of a double headed rivet 137 and a spacer sleeve 135 extending between the rail and the plate.

As in the first embodiment, FIGS. 1 to 5, in the second embodiment of FIGS. 6 and 7, a rack and pinion drive including the adjusting feature affords the movement of the seat in the sliding direction. In the second embodiment, however, drive pinion 172 mounted on the end of a drive shaft 174 is supported in the base plate 129, that is, it is supported on a portion of the upper part 134, while the rack 198 is secured to the L-shaped rail 117 which forms a part of the support member 116, note FIGS. 6 and 7.

In this second embodiment, rack 198 is formed by a rack toothed portion 156 and an L-shaped rail 188. At least at the opposite ends of the rack 198, the rack toothed portion 156 and the rail 188 are rigidly connected to one another through a stepped rivet bolt 160. The rack is secured between a shoulder 161 on the rivet bolt 160 and a rivet head 163 spaced axially from the shoulder. The rivet bolt 160 is secured to the L-shaped rail 117 by the rivet head 165 at the opposite end of the bolt 160 from the head 163. The rivet bolt 160 extends through an oblong hole 166 in the L-shaped rail 117 so that movement of the rivet bolt 160 and thus of the rack 198 can be effected in the direction of the double arrow B, note FIG. 6.

For an exact adjustment of the distance between the rack toothed portion 156 and the pinion 172 in all of the sliding positions of the guide mechanism, in this second embodiment a guide member 178 is provided having a guide roller 184 which engages within the longitudinal groove 186 formed in the rack 198 by the lower end of the rack toothed portion 156 and the lower end of an L-shaped rail 188. The guide member 178 is riveted to the base plate 129 to which the pinion 172 is attached. The longitudinal groove 186 in the rack 198 is formed in the same manner as in the first embodiment, that is between the rack toothed portion 156 and the L-shaped rail 188, note FIG. 7.

While specific embodiments of the invention have been shown and described in detail to illustrate the application of the inventive principles, it will be understood that the invention may be embodied otherwise without departing from such principles.

What is claimed is:

1. Adjusting device for a seat, particularly a seat in a motor vehicle, for moving the seat along a generally horizontally extending given direction, comprising a sliding seat guide mechanism, said sliding seat guide mechanism comprising a first part arranged to mount the seat and a separate second part located below said first part, said first part including a tubular upper part arranged to be connected to the seat, an elongated rack extending in the given direction and connected to one of said first and second parts and a pinion connected to the other one of said first and second parts, said rack disposed in meshed engagement with said pinion for moving said first and second parts relative to one another, wherein the improvement comprises that said rack is supported so that it can be adjustably displaced in a generally vertically extending direction extending transversely of the given direction for providing a predetermined dimension between said rack and the axis of said pinion, and a guide member mounted on said second part and extending into contact with said rack for maintaining the predetermined distance between said rack and the axis of said pinion, said first part includes two pair of L-shaped stampings located one above the other, each said pair of stampings being located adjacent and in contact with the bottom surface of an opposite end of said tubular upper part, each of said stampings having a horizontally extending leg and a vertically extending leg depending downwardly from said horizontally extending leg, said horizontally extending legs disposed in contact with one another and said vertically extending legs disposed in laterally spaced and general parallel relation, said rack extending between said pairs of stampings with said rack located between and secured to said vertically extending legs, said rack has a set of teeth thereon facing downwardly, said rack having a vertically extending oblong hole therethrough, a rivet extending through said vertically extending legs and said oblong hole for connecting said rack to said pair of stampings, a support member connected to and extending upwardly from said second part, a guide rail supported on the upper end of said support member, said horizontally extending legs of said stampings slidably mounted on said guide rail, webs extending downwardly from said horizontally extending legs and disposed on opposite sides of and closely adjacent to said guide rail, a support stirrup secured to said support member intermediate said pairs of stampings and extending upwardly therefrom and located laterally outwardly from said rack, said support stirrup having a free end located upwardly from said rack, a drive shaft extending transversely of and supported in said support member and support stirrup, said pinion mounted on said drive shaft and located below and in meshed engagement with said teeth on said rack, and said guide member is secured to said support stirrup above said rack, the upper edge of said rack being smooth, and said guide member is maintained in contact with the smooth upper edge of said rack.

2. Adjusting device for a seat, as set forth in claim 1, wherein said guide member comprises a guide roller in contact with the smooth upper edge of said rack.

3. Adjusting device for a seat, as set forth in claim 1 or 2, wherein an L-shaped rail is attached to said rack on the opposite side thereof from said support stirrup and said L-shaped rail comprises a vertically extending leg secured to said rack and a horizontally extending leg projecting from the upper end of said vertically extending leg toward said support stirrup, and said guide member disposed in contact with the rack below the lower surface of the horizontally extending leg of said L-shaped rail.

4. Adjusting device for a seat, as set forth in claim 1, wherein said rack comprises two parallel rack portions in side-by-side contact with said teeth formed in each of said rack portions and said teeth in each of said rack portions being aligned with one another.

* * * * *